(12) United States Patent
Hua et al.

(10) Patent No.: US 7,259,960 B2
(45) Date of Patent: Aug. 21, 2007

(54) MOUNTING APPARATUS FOR DATA STORAGE DEVICE

(75) Inventors: Wei-Bin Hua, Shenzhen (CN); Kun-Ming Lin, Shenzhen (CN); Shao-Bo Han, Shenzhen (CN)

(73) Assignees: Hong Fu Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/307,213

(22) Filed: Jan. 26, 2006

(65) Prior Publication Data

US 2006/0198096 A1    Sep. 7, 2006

(30) Foreign Application Priority Data

Mar. 3, 2005    (CN) .................. 2005 2 0055499 U

(51) Int. Cl.
  *G06F 1/16* (2006.01)
(52) U.S. Cl. .................. 361/685; 361/684; 312/223.1
(58) Field of Classification Search ........ 361/683–685; 312/223.1, 223.2, 223
See application file for complete search history.

(56) References Cited

U.S. PATENT DOCUMENTS

| | | | |
|---|---|---|---|
| 5,510,955 A | | 4/1996 | Taesang |
| 6,275,377 B1* | | 8/2001 | Liu et al. ..................... 361/685 |
| 6,373,695 B1* | | 4/2002 | Cheng ......................... 361/685 |
| 6,535,390 B1* | | 3/2003 | Lo .............................. 361/726 |
| 6,590,775 B2* | | 7/2003 | Chen ........................... 361/725 |
| 2004/0075978 A1* | | 4/2004 | Chen et al. .................. 361/685 |
| 2004/0221441 A1* | | 11/2004 | Williams ...................... 29/453 |
| 2005/0103729 A1* | | 5/2005 | Chen et al. ................... 211/26 |
| 2005/0190535 A1* | | 9/2005 | Peng et al. ................... 361/685 |

* cited by examiner

*Primary Examiner*—Jayprakash Gandhi
*Assistant Examiner*—Anthony Q Edwards
(74) *Attorney, Agent, or Firm*—Winston Hsu

(57) ABSTRACT

A mounting apparatus for a data storage device includes a drive bracket and a fixing plate. The data storage device has at least one locking hole in one sidewall. The drive bracket comprises a sidewall defining at least one through hole corresponding to the locking hole of the data storage device. The fixing plate is fixed on the drive bracket. The fixing plate comprises a first portion and a handling portion extending slantways from one end of the first portion. The other end of the first portion forms at least one insertion post which can extend through the through hole of the drive bracket and engage into the locking hole of the data storage device.

17 Claims, 4 Drawing Sheets

MOUNTING APPARATUS FOR DATA STORAGE DEVICE

FIELD OF THE INVENTION

The present invention relates to a mounting apparatus, and particularly to a mounting apparatus that readily attaches data storage device in a drive bracket.

DESCRIPTION OF RELATED ART

Various data storage devices are installed in a computer for communication and handling data. Such devices include, for example, hard disk drives, floppy disk drives and Compact Disk-Read Only Memory (CD-ROM) drives. A computer data storage device is usually directly secured to a bracket of the computer by screws. Installation and removal of the screws require a tool. This is unduly complicated and laborious, and reduces the deficiency of assembly in mass production facilities.

A common way to overcome the above shortcomings is to have a pair of rails formed in opposite side walls of a bracket. Such rails are disclosed in U.S. Pat. No. 5,510,955. A bracket has two pairs of leader rails on opposite sides thereof. Each pair of leader rails defines a pair of first coaxial holes. A pair of guide rails is respectively attached to opposite sides of a data storage device with bolts. Each guide rail comprises a pair of flanges defining a pair of second coaxial holes. The assembly of the storage device and the guide rails is inserted into the drive bracket by sliding the guide rails along the leader rails. A pair of locking pins is then extended through the first and second coaxial holes to thereby secure the storage device within the bracket. However, the computer enclosure needs extra operating space for carrying out the fixing operation, and mounting the guide rails to the data storage device with bolts is unduly complicated and time-consuming. Furthermore, the guide rails are generally made of plastic. This not only restricts grounding connection options between the data storage device and the drive bracket, but also tends to lead to extra maintenance, because the plastic rails are easily wearing out and needing replacement.

What is desired, therefore, is to provide a mounting apparatus which readily attaches a data storage device to a drive bracket.

SUMMARY OF INVENTION

In one preferred embodiment, a mounting apparatus includes a drive bracket for installing a data storage device therein, and a fixing plate. One sidewall of the data storage device has two locking holes. The drive bracket has two through holes corresponding to the locking holes of the data storage device. The fixing plate is mounting on the drive bracket. A pair of insertion posts extends perpendicularly from one end of a first portion of the drive bracket, and a handling portion extends slantways from the other end of the first portion.

Other advantages and novel features will become more apparent from the following detailed description of preferred embodiments when taken in conjunction with the accompanying drawings, in which:

DETAILED DESCRIPTION

Figure 1:
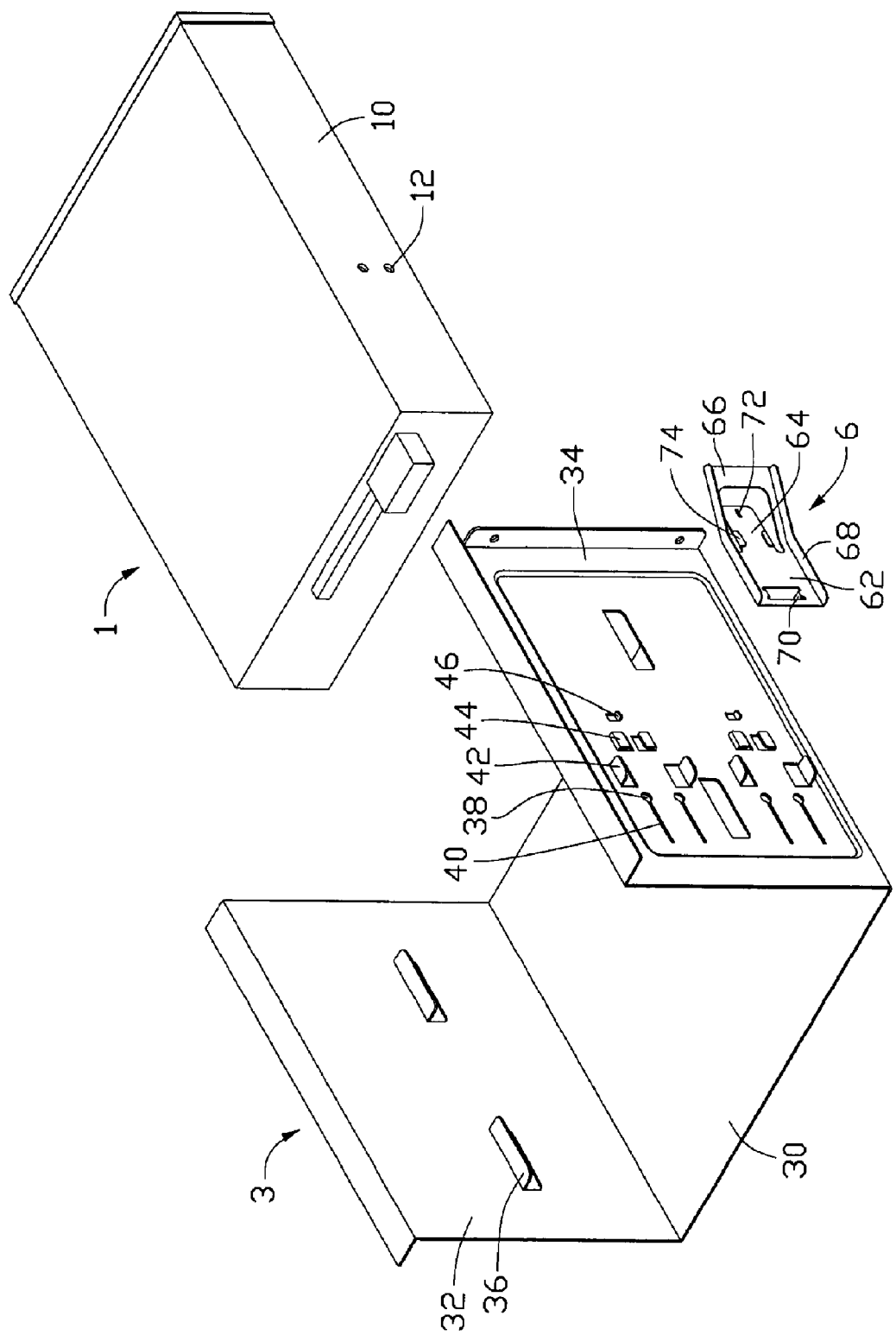
FIG. 1 is an exploded, isometric view of a mounting apparatus in accordance with a preferred embodiment of the present invention, together with a data storage device which can be received in a drive bracket of the mounting apparatus.

Referring to FIG. 1, a mounting apparatus in accordance with a preferred embodiment of the present invention is provided for holding a data storage device 1. The mounting apparatus includes a drive bracket 3 for installing the data storage device 1 therein, and a fixing plate 4. Two locking holes 12 are defined in one sidewall 10 of the data storage device 1.

The drive bracket 3 includes a bottom wall 30 and two sidewalls 32, 34 which extend perpendicularly from two opposite sides of the bottom wall 30. An inner surface of each sidewall 32, 34 has respective lead rails 36 thereof, for sliding of the data storage device 1 thereon. Two through holes 38 are defined in the sidewall 34 corresponding to the locking holes 12 of the data storage device 1. Two slits 40 are defined in the sidewall 34, and in communicating with corresponding through holes 38, respectively. The drive bracket 3 has a pair of parallel tabs 42 in the vicinity of the through holes 38, and two crooks 44 and a locating projection 46 are formed beside the tabs 42. A distal edge of the locating projection 46 is a bevel.

Figure 2:
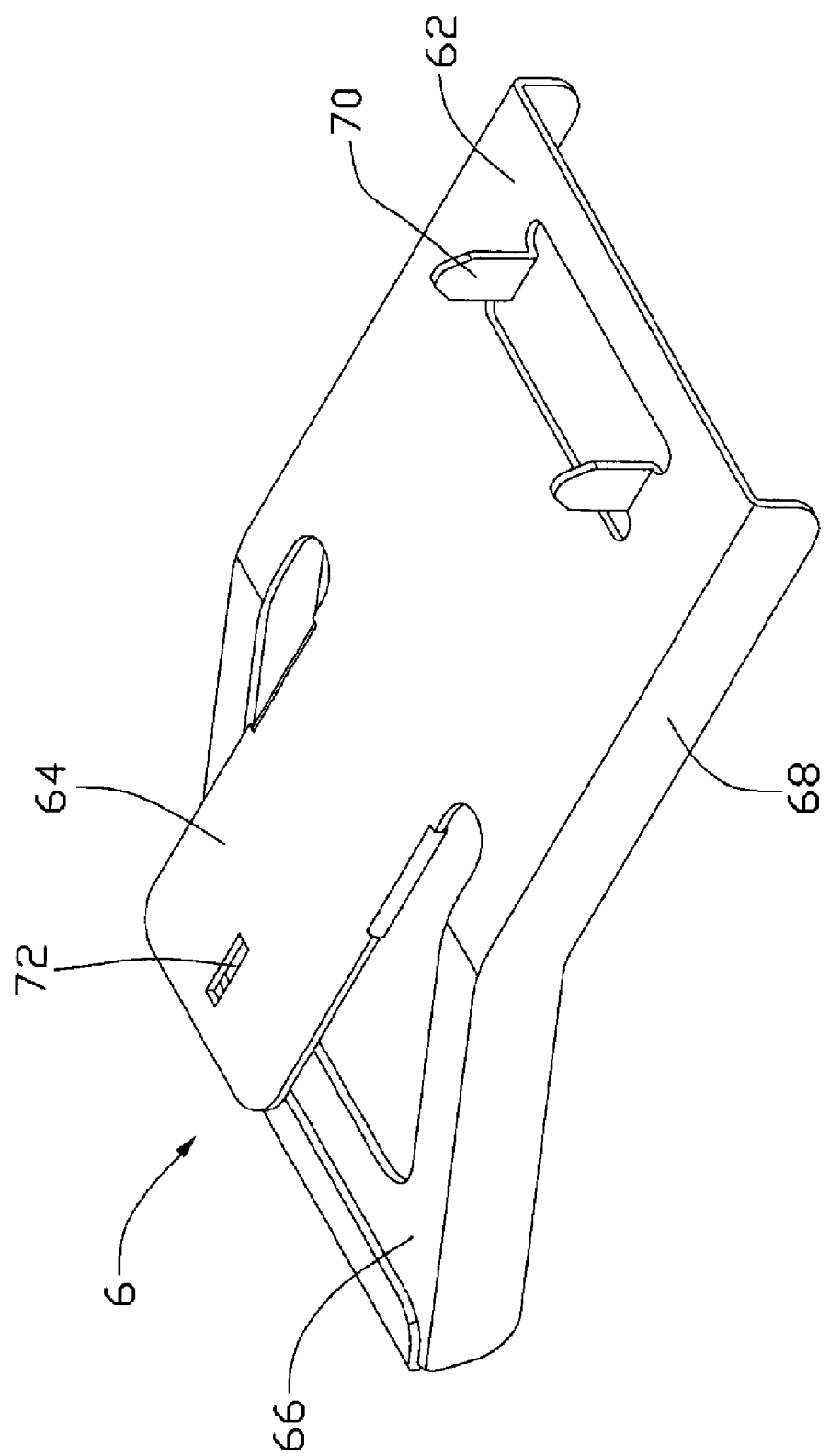
FIG. 2 is an exploded view of a fixing plate of the mounting apparatus of FIG. 1.

Referring also to FIG. 2, the fixing plate 6 includes a first portion 62, a second portion 64 extending from one end of the first portion 62, and a handling portion 66. The handling portion 62 extends slantways from the one end of the first portion 62 at which the first portion 62 joining the second portion 64. Two flanges 68 are bent from edges of the handling portion 64 and the first portion 62. The other end of the first portion 62 has a pair of insertion posts 70 extending perpendicularly inwardly therefrom. The free end of the second portion 64 has a cutout 72, and a reinforcing slice 74 on each side edge of the second portion 66 adjacent to the first portion 62.

Figure 3:
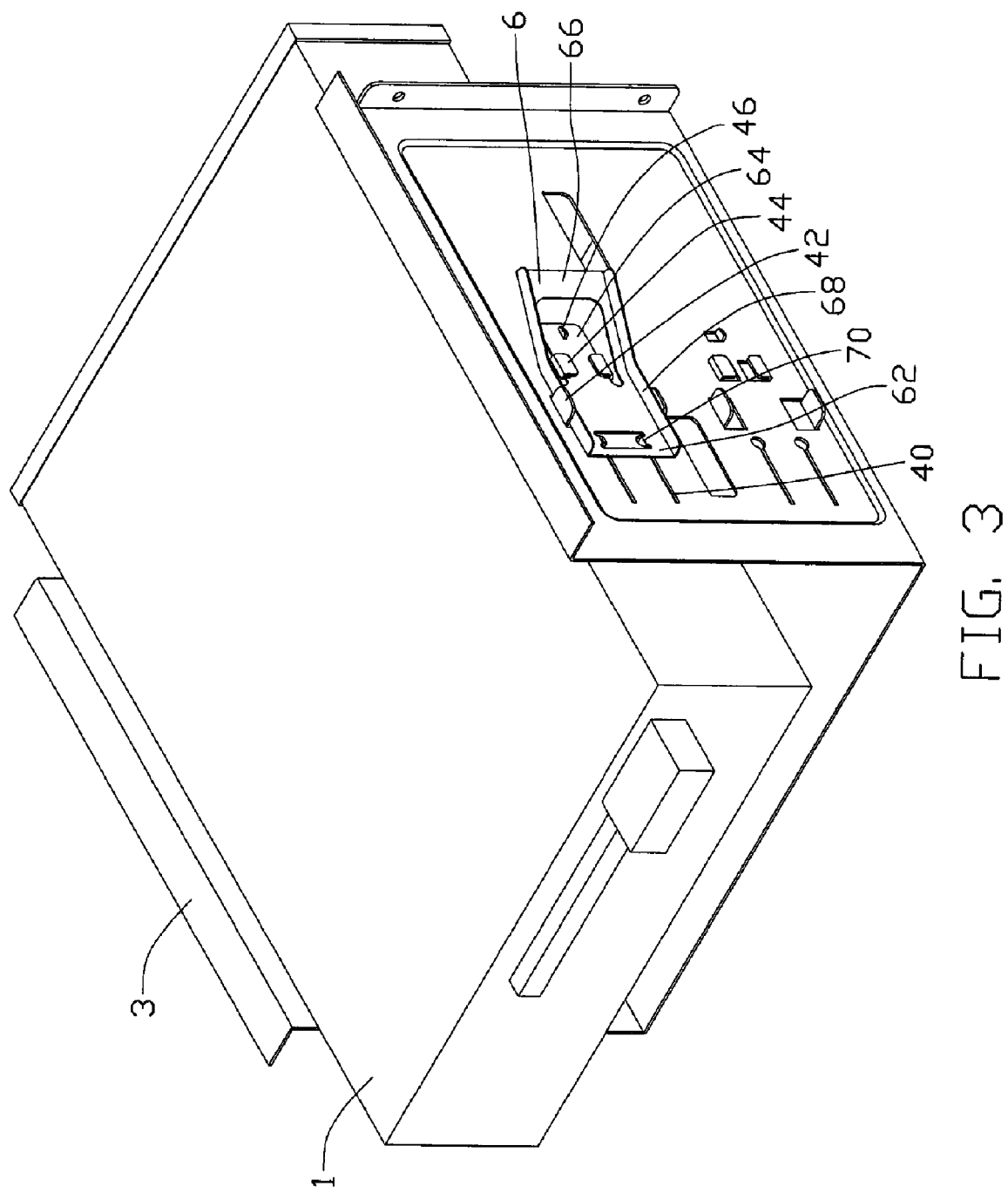
FIG. 3 is an assembled view of FIG. 1, showing a locked state.

Referring also to FIGS. 1, 2 and 3, in assembly, the insertion posts 70 of the fixing plate 6 slide into the through holes 38 of the drive bracket 3 along the corresponding slits 40, and simultaneously, the second portion 64 of the fixing plate 6 gets through the two corresponding crooks 44, the free end of the second portion 64 is put up and let the locating projection 46 of the drive bracket 3 to engage into the cutout 72 of the second portion 64, for assuring the fixing plate 6 fixing on the drive bracket 3. The two flanges 68 of the fixing plate 6 are between the parallel tabs 42 of the drive bracket 3.

Figure 4:
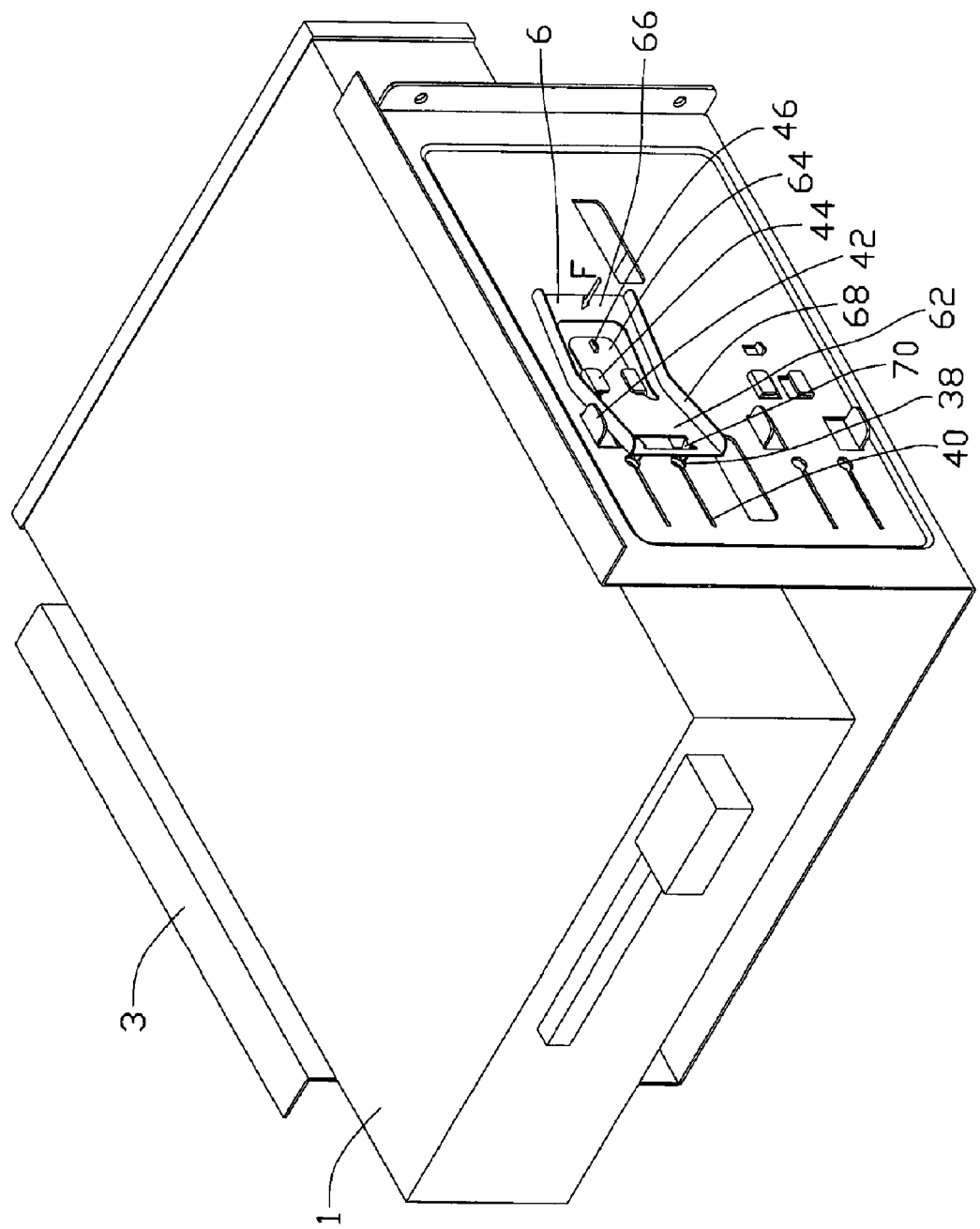
FIG. 4 is another assembled view of FIG. 1, showing an unlocked state.

Referring also to FIGS. 3 and 4, in use, depress the handling portion 66 of the fixing plate 6 for making the first portion 62 tilt up, the insertion posts 70 of the fixing plate 6 are withdrawn from the through holes 38 of the drive bracket 3, and the data storage device 1 is slid into the drive bracket 3 along the lead rails 36 until the locking holes 12 of the storage device 1 align with the through holes 38 of the drive bracket 3. Then release the handling portion 66 of the fixing plate 6, the insertion posts 70 of the first portion 62 return to their original position. Thus, said insertion posts 70 extend through the through holes 38 of the drive bracket 3 and engage into the holes 12 of the data storage device 1, thereby securing the data storage device 1 within the drive bracket 3.

In removal of said data storage device 1, the handling portion 66 of the fixing plate 6 is pressed, and the insertion posts 70 are withdrawn from the holes 12, 38 of the data storage device 1 and the drive bracket 3. Then, said data storage device 1 is readily slid out from the drive bracket 3.

If there is no necessity for removing the fixing plate 6 from the drive bracket 3, the fixing plate can also be secured on the drive bracket 3 by other means, for example, by riveting joint etc.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A mounting apparatus for securing a data storage device having at least one locking hole in one sidewall thereof, the mounting apparatus comprising:
    a drive bracket for installing the data storage device therein, the drive bracket comprising a sidewall defining at least one through hole therein corresponding to the locking hole of the data storage device; and
    a fixing plate fixed on the drive bracket, the fixing plate comprising a first portion, and a handling portion extending slantways from one end of the first portion, the other end of the first portion forming at least one insertion post which can extend through the at least one through hole of the drive bracket and engage into the at least one locking hole of the data storage device.

2. The mounting apparatus as described in claim 1, wherein at least one slit is defined in the sidewall of the drive bracket, and communicating with the at least one through hole of the sidewall of the drive bracket.

3. The mounting apparatus as described in claim 2, wherein a pair of parallel tabs is formed from the sidewall of the drive bracket in the vicinity of the at least one through hole.

4. The mounting apparatus as described in claim 3, wherein two crooks and a location projection are formed from the sidewall of the drive bracket beside the tabs.

5. The mounting apparatus as described in claim 4, wherein a distal edge of the locating projection is a bevel.

6. The mounting apparatus as described in claim 5, wherein the fixing plate further comprises a second portion extending from said one end of the first portion, and the second portion through the two corresponding crooks formed from said sidewall.

7. The mounting apparatus as described in claim 6, wherein a free end of the second portion has a cutout corresponding to the locating projection.

8. A mounting apparatus assembly comprising:
    a data storage device defining a locking hole in one sidewall thereof;
    a drive bracket for installing the data storage device therein, the drive bracket comprising a sidewall defining a through hole corresponding to the locking hole of the data storage device; and
    a fixing plate slidably attached to the drive bracket, the fixing plate comprising a first portion, a second portion fixed on the drive bracket, and a handling portion extending slantways from one end of the first portion, the other end of the first portion forming an insertion post which can extend through the through hole of the drive bracket and engage into the locking hole of the data storage device.

9. The mounting apparatus assembly as described in claim 8, wherein the insertion post extends perpendicularly inwardly from the other end of the first portion.

10. The mounting apparatus assembly as described in claim 8, wherein a slit is defined in the sidewall, and communicating with the at least one through hole.

11. The mounting apparatus assembly as described in claim 8, wherein the second portion extends from the one end of the first portion at a point in which the first portion joins the handling portion.

12. The mounting apparatus assembly as described in claim 8, wherein the drive bracket comprises two sidewalls, and an inside surface of each of the two sidewalls has respective lead rails thereof to support and lead the data storage device sliding into the drive bracket.

13. The mounting apparatus assembly as described in claim 8, wherein a mounting section is formed on the second portion and configured for engaging with the sidewall of the drive bracket to thereby mount the fixing plate to the sidewall of the drive bracket.

14. The mounting apparatus assembly as described in claim 13, wherein a locating projection extends from the sidewall of the drive bracket, the mounting section comprises a cutout for receiving the locating projection.

15. The mounting apparatus assembly as described in claim 13, wherein two crooks extend from the sidewall of the drive bracket for compressing two sides of the second portion.

16. A mounting apparatus securing a data storage device having at least one locking hole in one sidewall thereof, the mounting apparatus comprising:
    a drive bracket configured for accommodating the data storage device therein, the drive bracket comprising a sidewall defining at least one through hole therein corresponding to the at least one locking hole of the data storage device, and a securing means formed on the sidewall of the drive bracket; and
    a fixing plate comprising a first portion, a second portion extending from one end of the first portion, and a handling portion extending slantways from the first portion adjacent the one end thereof from which the second portion extends, the other end of the first portion forming at least one insertion post extending through the at least one through hole and engaging in the at least one locking hole, thereby securing the data storage device in the drive bracket, the second portion being secured to the securing means of the drive bracket thereby securing the fixing plate to drive bracket.

17. The mounting apparatus as described in claim 16, wherein the securing means of the drive bracket comprises a pair of L-shaped crooks, and a location projection formed on the sidewall of the drive bracket, the second portion is confined by the crooks, and defines a cutout for insertion of the location projection.

* * * * *